(12) United States Patent
Hyun et al.

(10) Patent No.: US 10,878,224 B2
(45) Date of Patent: Dec. 29, 2020

(54) METHOD AND SYSTEM FOR IMAGE PROCESSING

(71) Applicant: LINE Corporation, Tokyo (JP)

(72) Inventors: Cheol Hyun, Seoul (KR); Shin Kim, Seoul (KR); Byoung Cho Park, Seoul (KR); Byoung Gon Yoo, Seoul (KR)

(73) Assignee: LINE Corporation, Tokyo (JP)

(*) Notice: Subject to any disclaimer, the term of this patent is extended or adjusted under 35 U.S.C. 154(b) by 92 days.

(21) Appl. No.: 16/020,269

(22) Filed: Jun. 27, 2018

(65) Prior Publication Data
US 2019/0005309 A1  Jan. 3, 2019

(30) Foreign Application Priority Data

Jun. 29, 2017  (KR) .................. 10-2017-0082472

(51) Int. Cl.
| | | |
|---|---|---|
| G06K 9/00 | (2006.01) | |
| G06T 13/40 | (2011.01) | |
| G06T 7/246 | (2017.01) | |
| G06F 3/01 | (2006.01) | |

(52) U.S. Cl.
CPC ......... G06K 9/00281 (2013.01); G06F 3/012 (2013.01); G06F 3/013 (2013.01); G06K 9/00315 (2013.01); G06T 7/246 (2017.01); G06T 13/40 (2013.01); *G06F 2203/011* (2013.01)

(58) Field of Classification Search
CPC ..... G06K 9/00281; H04N 5/217; G06T 13/40
See application file for complete search history.

(56) References Cited

U.S. PATENT DOCUMENTS

| | | | | |
|---|---|---|---|---|
| 2005/0047662 A1* | 3/2005 | Gorodnichy | ............ | G06F 3/013 |
| | | | | 382/218 |
| 2014/0085514 A1* | 3/2014 | Lin | ............ | H04N 5/2628 |
| | | | | 348/241 |
| 2016/0042548 A1* | 2/2016 | Du | ............ | G06T 7/251 |
| | | | | 345/473 |
| 2016/0300099 A1* | 10/2016 | Xiaolu | ............ | G06T 7/246 |

FOREIGN PATENT DOCUMENTS

| | | |
|---|---|---|
| JP | 2009075880 A | 4/2009 |
| KR | 20110021330 A | 3/2011 |
| KR | 20120059994 A | 6/2012 |
| KR | 20160033404 A | 3/2016 |

OTHER PUBLICATIONS

Korean Office Action dated Nov. 21, 2018 issued in Korean Patent Application No. 10-2017-0082472.

* cited by examiner

*Primary Examiner* — Myron Wyche
(74) *Attorney, Agent, or Firm* — Harness, Dickey & Pierce, P.L.C.

(57) ABSTRACT

Provided is an image processing method and system. More particularly, provided are an image processing method and system that may map a facial expression of a user, a specific event, etc., to a character in real time by mapping an object such as a face of a user included in an input image to a virtual object such as a face of a specific character, and by applying an event corresponding to a combination of components defined for the object to the virtual object, and a non-transitory computer-readable recording medium that, when executed by a processor, cause the processor to implement the image processing method in conjunction with a computer device.

19 Claims, 11 Drawing Sheets

METHOD AND SYSTEM FOR IMAGE PROCESSING

CROSS-REFERENCE TO RELATED APPLICATION(S)

This U.S. non-provisional application claims the benefit of priority under 35 U.S.C. § 119 to Korean Patent Application No. 10-2017-0082472 filed on Jun. 29, 2017, in the Korean Intellectual Property Office (KIPO), the entire contents of which are incorporated herein by reference.

BACKGROUND

Field

One or more example embodiments relate to image processing methods and/or systems, and more particularly, to image processing methods and/or systems that may map a facial expression of a user, a specific event, etc., to a character in real time by mapping an object (e.g., a face of a user) included in an input image to virtual object (e.g., a face of a specific character), and by applying an event corresponding to a combination of components desired or predefined for the object to the virtual object, and a non-transitory computer-readable recording medium that, when executed by a processor, cause the processor to implement the image processing method in conjunction with a computer device.

Description of Related Art

As the related art for controlling a specific character, such as an avatar, there is a technique for applying facial expressions of a user to the avatar. For example, Korean Laid-Open Publication No. 10-2012-0059994 discloses an avatar controlling apparatus and method using a facial expression control point, which applies a facial expression of a user to an avatar by controlling a feature point location of an avatar based on a feature point location tracked from the facial expression of the user.

If feature point locations tracked from a face of the user are applied to the avatar as are, the facial expression of the user may be applied well to the avatar. Unfortunately, however, the feature point location based apparatus and method may exhibit an unnatural expression on the avatar from perspective of the avatar. For example, if a facial expression of the user is applied to a face of a character, which is dissimilar from a face of the user, such apparatuses or methods may exhibit a very unsuitable facial expression on the face of the character.

SUMMARY

One or more example embodiments provide image processing methods and/or systems that may apply a change (e.g., a change in a facial expression) of an object (e.g., a face of user) included in an input image to a virtual object and may further naturally apply such a change to a virtual object by determining values of components (e.g., an eye, nose, a mouth, an eyebrow, an angle of a face, etc.) defined for the object, by selecting a single event from among events desired (or alternatively, preset) for the virtual object based on a combination of the determined values, and by applying the selected event to the virtual object, and a non-transitory computer-readable recording medium storing instructions that, when executed by a processor, cause the processor to implement the image processing method in conjunction with a computer device.

According to an aspect of at least one example embodiment, there is provided a non-transitory computer-readable recording medium storing instructions that, when executed by a processor, cause the processor to implement an image processing method in conjunction with a computer, the image processing method including extracting landmark information of an object included in an input image, mapping the object included in the input image to a virtual object based on the landmark information, determining values of a plurality of components with respect to the object based on the landmark information, determining an event corresponding to a combination of the determined values of the plurality of components, and applying the determined event to the virtual object.

According to an aspect of at least one example embodiment, there is provided an image processing method including extracting landmark information of an object included in an input image; mapping the object included in the input image to a virtual object based on the landmark information, determining values of a plurality of components with respect to the object based on the landmark information, determining an event corresponding to a combination of the determined values of the plurality of components, and applying the determined event to the virtual object.

According to an aspect of at least one example embodiment, there is provided a non-transitory computer-readable recording medium storing a program to implement the aforementioned image processing method.

According to some example embodiments, it is possible to apply a change (e.g., a change in a facial expression) of an object (e.g., a face of user) included in an input image to a virtual object and to further naturally apply such a change to a virtual object by determining values of components (e.g., an eye, nose, a mouth, an eyebrow, an angle of a face, etc.) desired (or alternatively, predefined) for the object, by selecting a single event from among events desired (or alternatively, preset) for the virtual object based on a combination of the determined values, and by applying the selected event to the virtual object.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
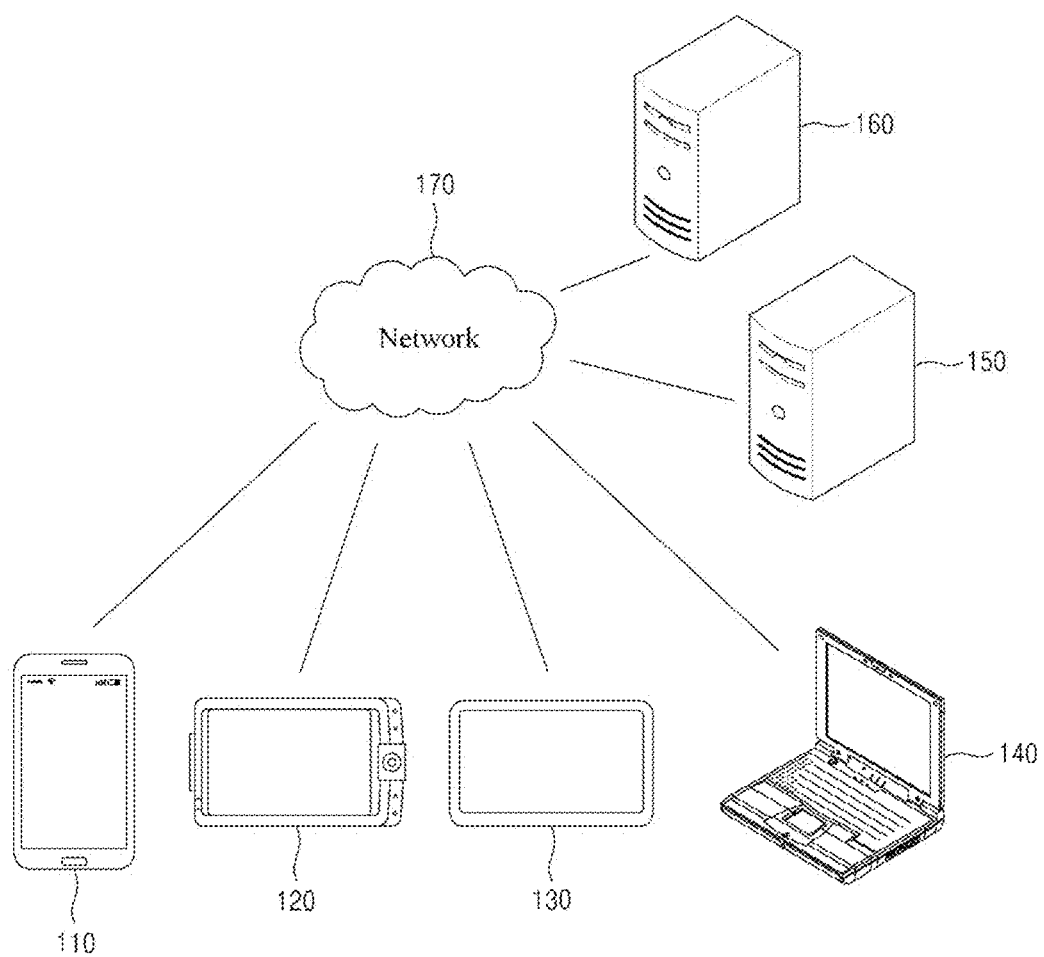
FIG. 1 is a diagram illustrating an example of a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, or block diagrams) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU, a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

An image processing system according to example embodiments may be configured through a computer device such as an electronic device or a server to be described below, and an image processing method according to example embodiments may be implemented through the electronic device or the server. For example, an application configured as a computer program may be installed and executed, and the electronic device may process an input image under control of the executed application and may apply an even to a virtual object. The computer program may be stored in a non-transitory computer readable recording medium to implement the image processing method in conjunction with the electronic device. As another example, the server may perform the image processing method under control of the application.

According to an example embodiment, a computer device such as an electronic device or a server may apply a change (e.g., a change in a facial expression) of an object (e.g., a face of a user) included in an input image to a virtual object and may further naturally apply such a change to a virtual object by determining values of components (e.g., an eye, nose, a mouth, an eyebrow, and/or an angle of a face) predefined for the object, by selecting a single event from among events desired (or alternatively, preset) for the virtual object based on a combination of the determined values, and by applying the selected event to the virtual object.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices and/or a number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, a navigation, a computer, a laptop computer, a digital broadcasting terminal, a personal digital assistant (PDA), a portable multimedia player (PMP), or a tablet personal computer (PC). Although FIG. 1 illustrates the electronic device 110 in a shape of a smartphone, it is provided as an example only. The electronic device 110 may refer to any type of various devices capable of communicating with other electronic devices 120, 130, and/or 140, and/or the servers 150 and/or 160 over the network 170 in a wired communication manner or in a wireless communication manner.

The communication scheme is not particularly limited and may include a communication method that uses a near field communication between devices as well as a communication method using a communication network (e.g., a mobile communication network, the wired Internet, the wireless Internet, a broadcasting network, or a satellite network), which may be included in the network 170. For example, the network 170 may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Further, the network 170 may include at least one of network topologies that include a bus network, a star network, a ring network, a mesh network, a star-bus network, a tree or hierarchical network, and the like. However, it is only an example, and example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and/or 140 over the network 170. For example, the server 150 may be a system that provides a first service to the plurality of electronic devices 110, 120, 130, and/or 140 connected over the network 170. The server 160 may be a system that provides a second service to the plurality of electronic devices 110, 120, 130, and/or 140 connected over the network 170. In some example embodiments, the server 160 may provide, as the second service, an installation file, for example, an application program package file, for installing an application, for example, a computer program, on the plurality of electronic devices 110, 120, 130, and/or 140. Further, the server 150 may provide, as the first service, a service (e.g., a messaging service, a social network service, or a content providing service) associated with the application to the plurality of electronic devices 110, 120, 130, and/or 140. The services are provided as an example only to describe the network environment and various services may be provided from each of the servers 150 and 160 in an actual network environment.

As described above, the image processing method according to the example embodiments may be performed by an electronic device and may also be performed by a server that communicates with the electronic device.

Figure 2:
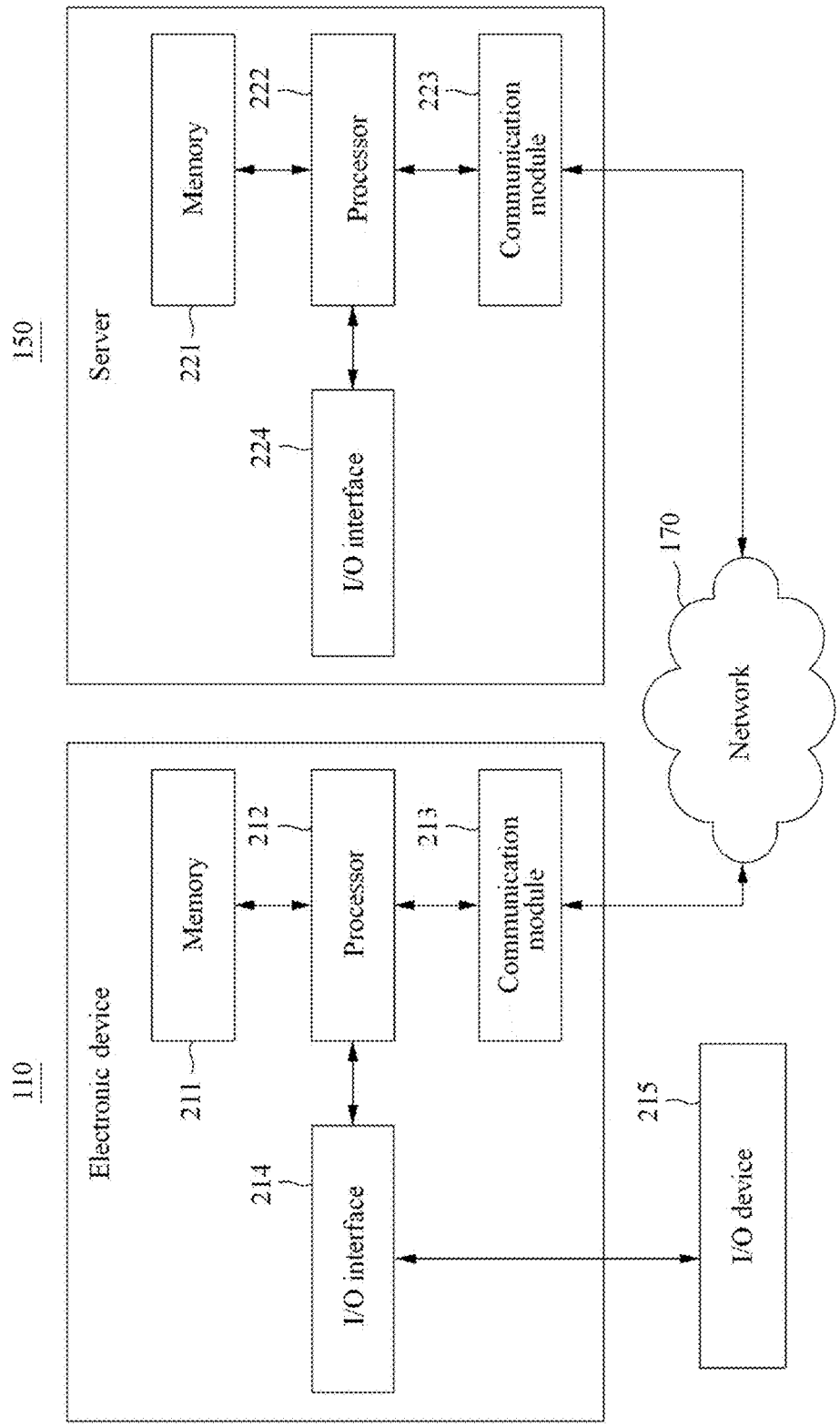
FIG. 2 is a block diagram illustrating a configuration of an electronic device and a server according to at least one example embodiment.

FIG. 2 is a block diagram illustrating an example of a configuration of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device (e.g., random access memory (RAM), read only memory (ROM), a disk drive, a solid state drive, and/or a flash memory) as a non-transitory computer-readable storage medium. Here, the permanent mass storage device, such as ROM and a disk drive, may be included in the electronic device 110 or the server 150 as a permanent storage device separate from the memory 211, 221. Further, an OS, or at least one program code (e.g., a code for an application for providing a specific service installed on the electronic device 110) and/or a browser installed and executed on the electronic device 110 may be stored in the memory 211, 221. Such software components may be loaded from another non-transitory computer-readable storage medium separate from the memory 211, 221 using a drive mechanism. In some example embodiments, the non-transitory computer-readable storage medium may include, for example, a floppy drive, a disk, a tape, a DVD/CD-ROM drive, or a memory card. According to other example embodiments, software components may be loaded to the memory 211, 221 through the communication module 213, 223, instead of, or in addition to, the non-transitory computer-readable storage medium. For example, at least one program may be loaded to the memory 211, 221 based on a program (e.g., the application) installed by files provided over the network 170 from developers or a file distribution system, for example, the server 150, which provides an installation file of the application.

The processor 212, 222 may be configured to process computer-readable instructions of a computer program by performing basic arithmetic operations, logic operations, and/or I/O operations. The computer-readable instructions may be provided from the memory 211, 221 and/or the communication module 213, 223 to the processor 212, 222. For example, the processor 212, 222 may be configured to execute received instructions in response to the program code stored in the storage device (e.g., the memory 211, 222).

The communication module 213, 223 may support communication between the electronic device 110 and the server 150 over the network 170, and may support communication between the electronic device 110 and/or the server 150 and another electronic device (e.g., example, the electronic device 120 or another server such as the server 160). For example, the processor 212 of the electronic device 110 may transfer a request created based on a program code stored in the storage device such as the memory 211, to the server 150 over the network 170 under control of the communication module 213. Conversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and the content, the file, etc. may be stored in a storage medium further includable in the electronic device 110.

The I/O interface 214 may be a device used for interface with an I/O device 215. For example, an input device may include a keyboard, a mouse, a microphone, and/or a camera, and an output device may include a display for displaying a communication session of the application. As another example, the I/O interface 214 may be a device for interface with an apparatus in which an input function and an output function are integrated into a single function, such as a touch screen. The I/O device 215 may be configured as a single device with the electronic device 110. Further, the I/O interface 224 of the server 150 may be a device used for connection with the server 150 or for interface with a device (not shown) for input or output includable in the server 150. In some example embodiments, in response to processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a greater or lesser number of components than a number of components shown in FIG. 2. However, there is no need to clearly illustrate many components according to the related art. For example, the electronic device 110 may include at least a portion of the I/O device 215, or may further include other components such as a transceiver, a global positioning system (GPS) module, a camera, a variety of sensors, and/or a database. In the case that the electronic device 110 is a smartphone, the electronic device 110 may be configured to further include a variety of components such as an accelerometer sensor, a gyro sensor, a camera module, various physical buttons, a button using a touch panel, an I/O port, and/or a vibrator for vibration, which are generally included in the smartphone.

Figure 3:
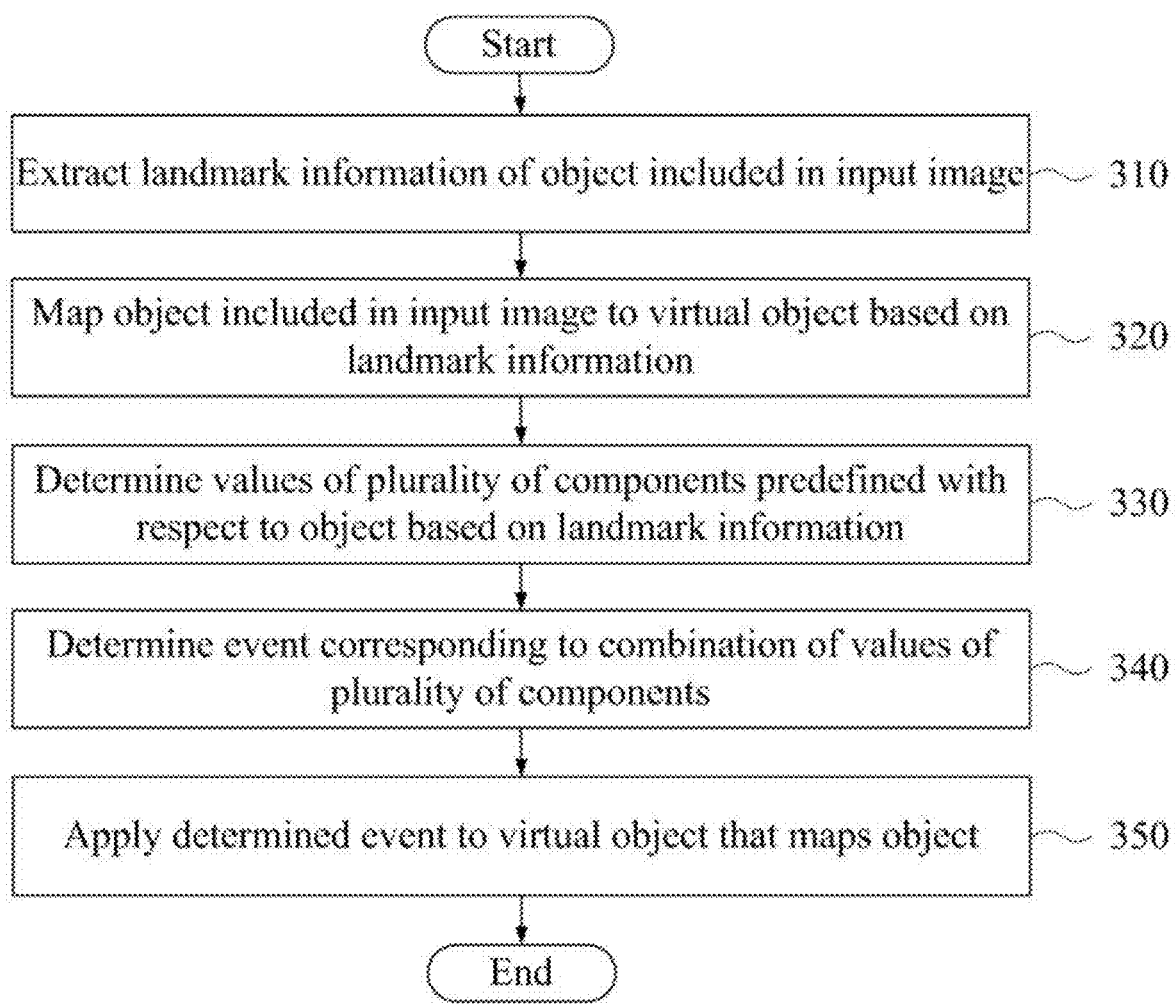
FIG. 3 is a flowchart illustrating an example of an image processing method according to at least one example embodiment.

FIG. 3 is a flowchart illustrating an example of an image processing method according to at least one example embodiment. The image processing method may be performed by a computer device such as the electronic device 110 or the server 150. A process of performing, by the electronic device 110, the image processing method will be described with reference to FIG. 3. The processor 212 of the electronic device 110 may be configured to execute control instructions according to a code of at least one computer program or a code of an OS included in the memory 211. Here, the processor 212 may control the electronic device 110 to perform operations 310 through 350 included in the image processing method of FIG. 3 in response to a control instruction provided from a code stored in the electronic device 110.

Referring to FIG. 3, in operation 310, the electronic device 110 may extract landmark information of an object included in an input image. Here, the object may include a target, such as a face of a user included in the image, to be replaced with a virtual object, and the landmark information may include a feature point location, for example, coordinates of a feature point in a virtual coordinate system associated with the image. A technique for controlling an avatar based on a feature point location is introduced. A detailed technique for extracting landmark information may be easily understood by those of ordinary skill in the art through the known arts.

In operation 320, the electronic device 110 may map the object included in the input image to the virtual object based on the landmark information. If the object is the face of the user included in the image, the virtual object may refer to the object that is included in the image, such as a face of a specific character or an avatar of the user.

For example, in the case of replacing the face of the user included in the image with the face of the specific character and providing the replaced face, or in the case of providing the face of the specific character, the electronic device 110 may provide the face of the specific character by applying a facial expression of the user included in the image to the face of the specific character. For example, the electronic device 110 may replace a face of the user in an image input through a camera for a video call with the face of the specific character and may provide the replaced face of the specific character. As another example, while providing a substitute image in which the face of the specific character is included instead of providing the image for the video call, the electronic device 110 may apply the facial expression of the user in the input image to a face of a character in the substitute image and thereby provide the substitute image in which the facial expression of the user is applied.

As another example, the electronic device 110 may record a face of a character to which a facial expression of the user or an event such as a related effect is applied as a moving picture and may create and provide a moving picture file or a moving GIF format file. Here, the created files may be shared with other users through a messaging service or a social network service. In this case, the electronic device 110 may add an additional effect, for example, a decoration effect, to a result image.

As described above, the image processing method may be performed through the server 150. For example, the electronic device 110 may sequentially transmit images input through the camera to the server 150, or may transmit a desired or prestored image file to the server 150. Here, the server 150 may perform the image processing method on the image transmitted and input from the electronic device 110, and may provide a result thereof to the electronic device 110 and/or other electronic devices.

Hereinafter, a process of applying a specific event to the virtual object based on extracted landmark information will be described.

In operation 330, the electronic device 110 may determine a value of each of a plurality of components desired or predefined with respect to the object based on the landmark information. Types of the plurality of components may be predefined. For example, if the object is a face of the user included in the image, the plurality of components may include items such as eyes, noise, a mouth, eyebrows, and/or an angle of the object, and the like. Here, a value of a specific component may refer to a value indicating a shape or an angle associated with the specific component. For example, a component corresponding to "Eye Left" may have one of desired (or alternatively, preset) values, such as "close an eye," "open an eye," and "half-close an eye (or half-open an eye)." That is, if the "Eye Left" is open on the face of the user included in a current frame of the input image, a value of the component "Eye Left" may be determined as "open an eye." The component and the value of the component are further described below.

In operation 340, the electronic device 100 may determine an event corresponding to a combination of values of the plurality of components. For example, if a value of the component "Eye Left" is "open an eye" and a value of the component "Eye Right" is "close an eye," the electronic device 110 may determine an event, such as "right eye winks." Here, if a value of the component "mouth" such as a shape of mouth is further combined, the event may be further clearly determined. Here, the combination of values of components has no need to be a combination of all of the values. For example, a value of a single specific component or a combination of values of two or more specific components excluding general values may be used.

In operation 350, the electronic device 110 may apply the determined event to the virtual object that maps the object. Here, the event may be desired (or alternatively, preset) for a virtual object that matches a specific object. That is, events suitable for each virtual object may be desired (or alternatively, preset) and an event of a virtual object determined based on an object may be applied to the virtual object. Thus, a further natural change may be applied to the virtual object. For example, a facial expression (event) of an avatar corresponding to a facial expression of the user may be applied to the avatar, instead of applying the facial expression of the user as is to the avatar. Here, the event may be defined or predefined per combination of values of a plurality of components. Therefore, a large number of events may be defined based on a number of the plurality of components and a number of values definable for a single component. For example, if three values are defined for the component "Eye Left," three values are defined for the component "Eye Right" and three values are defined for the component "mouth," nine (=3*3*3) events may be predefined for a corresponding virtual object based on the combination thereof.

Depending on example embodiments, the defined or predefined plurality of components may include a plurality of landmark components included in the object and a plurality of angular components indicating rotation of the object. For example, the landmark components may correspond to landmarks of the object such as eyes, nose, a mouth, and eyebrows, and/or the angular components may correspond to plurality of rotational axes, such as an X-axis, a Y-axis, and a Z-axis.

In the example embodiment of FIG. 3, the electronic device 110 may set and manage a plurality of shape values indicating two or more different shapes for one or more of the plurality of landmark components, for example, prior to operation 310. As described above, three shape values, such as "close an eye," "open an eye," and "half-open an eye (or half-close an eye)" may be set or preset, and managed for the landmark component corresponding to "Eye Left."

Figure 4:
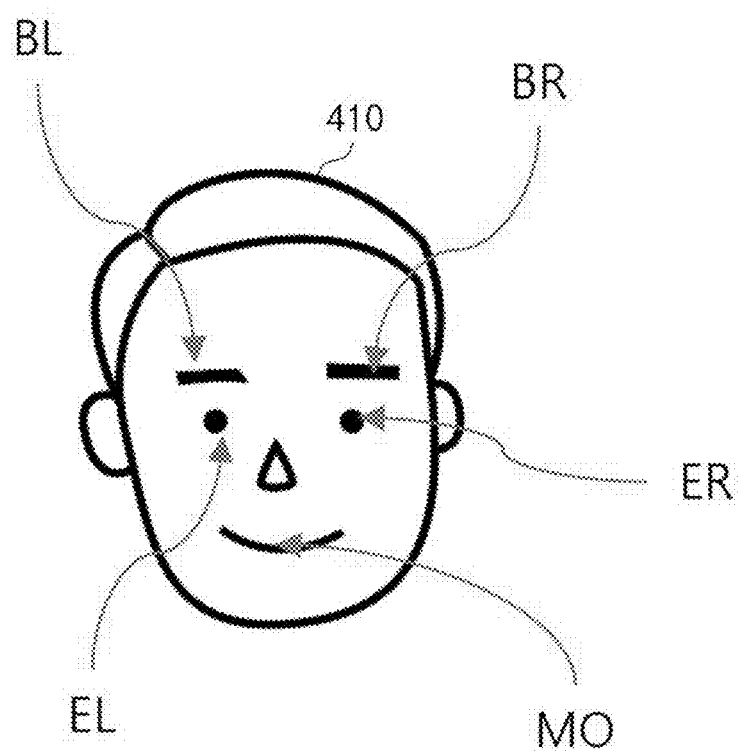
FIG. 4 illustrates an example of a landmark component of a face object according to at least one example embodiment.

FIG. 4 illustrates an example of a landmark component of a face object according to at least one example embodiment. Referring to FIG. 4, landmark components included in a face object 410 represent "eye Brow Left (BL)," "eye Brow Right (BR)," "Eye Left (EL)," "Eye Right (ER)," and "Mouth (MO)," respectively. The following Table 1 shows examples of identifiers (IDs) and values for the landmark components.

TABLE 1

| Component ID | Description of abbreviation | Description | Value: 1 | Value: 2 | Value: 3 |
| --- | --- | --- | --- | --- | --- |
| BL | eyeBrowLeft | shape of left eyebrow | toward bottom right end | toward top right end | — |
| BR | eyeBrowRight | shape of right eyebrow | toward bottom left end | toward top left end | — |
| EL | EyeLeft | shape of left eye | close an eye | open an eye | half-open an eye |
| ER | EyeRight | shape of right eye | close an eye | open an eye | half-open an eye |
| MO | Mouth | shape of mouth | A | I | O |

Although Table 1 is represented in a text form to help understanding of values of components, it is provided as an example only. A corresponding value may be set as a numerical value or other types corresponding to a shape of the corresponding value and stored in a system.

In this case, the electronic device 110 may determine a shape value corresponding to a shape of a first landmark component determined based on landmark information among a plurality of shape values managed for the first landmark component, as a value of the first landmark component. Referring to Table 1, if the first landmark component is "Eye Left" and a shape of the first landmark component determined based on landmark information is "open an eye," a value of the first landmark component may be determined as a value indicating "open a left eye" such as "EL1."

In the example embodiment of FIG. 3, the electronic device 110 may set and manage a plurality of angular values representing two or more different angles for one or more of the plurality of rotational axes prior to operation 310.

Figure 5:
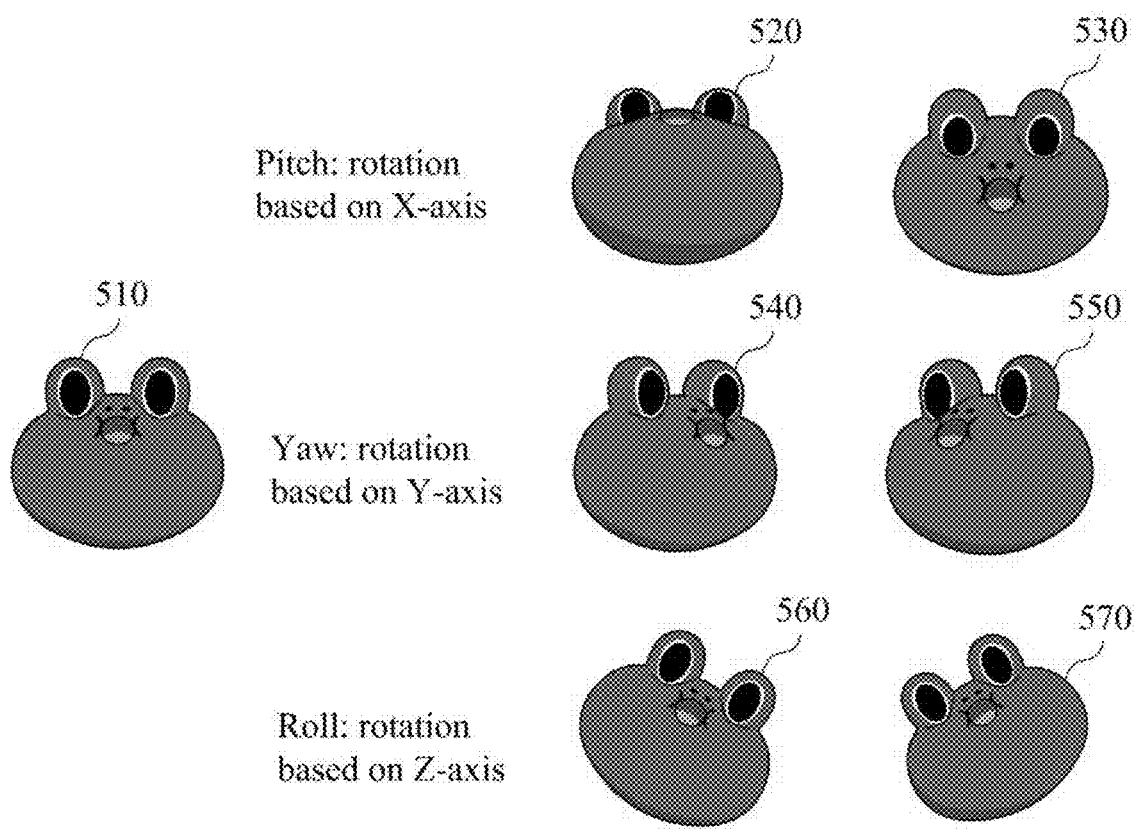
FIG. 5 illustrates an example of an angular component of a face object according to at least one example embodiment.

FIG. 5 illustrates an example of an angular component of a face object according to at least one example embodiment. Referring to FIG. 5, shapes 520 and 530 may be acquired in response to rotating a face object 510 based on an X-axis, shapes 540 and 550 may be acquired in response to rotating the face object 510 based on the Y-axis, and shapes 560 and 570 may be acquired in response to rotating the face object 510 based on the Z-axis. The following Table 2 shows examples of IDs and values of angular components.

TABLE 2

| Component ID | Description of abbreviation | Description | Value: 1 | Value: 2 |
| --- | --- | --- | --- | --- |
| PA | PitchAngle | X-axis based rotation | lean forward | lean backward |

TABLE 2-continued

| Component ID | Description of abbreviation | Description | Value: 1 | Value: 2 |
|---|---|---|---|---|
| YA | YawAngle | Y-axis based rotation | lean to right | lean to left |
| RA | RollAngle | Z-axis based rotation | toward bottom right end | toward bottom left end |

Although Table 2 is represented in a text form to help understanding of values of components, it is provided as an example only. A corresponding value may be set as a numerical value or other types corresponding to a shape of the corresponding value and stored in a system.

In this case, the electronic device 110 may determine an angle of an object for a first rotational axis among a plurality of rotational axes based on landmark information, and may determine an angular value corresponding to the determined angle of the object among a plurality of angular values managed for the first rotational axis among the plurality of rotational axes as a value of an angular component corresponding to the first rotational axis. For example, if the first rotational axis is a Z-axis and an angle of the object for the Z-axis determined based on landmark information is "toward bottom right end," the value of the angular component may be set as a value indicating toward bottom right end of the Z-axis based rotation such as "RA1."

The following Table 3 shows examples of an event corresponding to a combination of values of components.

TABLE 3

| Combination | Indication | Example of event |
|---|---|---|
| EL1 + ER2 | left eye winks | EL wink |
| ER1 + EL2 | right eye winks | ER wink |
| EL1 + ER2 + MO1 | left eye winks with mouth open | EL wink + shoot heart from EL |
| ER1 + EL2 + MO1 | right eye winks with mouth open | ER wink + shoot heart from ER |
| BL1 + BR1 | frown | angry effect |
| BL1 + BR1 + MO1 | frown with mouth in "A" shape | angry effect 2 |
| ... | ... | ... |

For example, "EL1+EL2" of Table 3 may represent a combination of "close an eye" for "EL" and "open eye" for "ER" and may indicate "left eye winks." Here, the event "EL wink" may be applied to a virtual object, for example, a face of a character corresponding to the face of the user. Further, in addition to simply applying a facial expression of the user, various effects, such as an animation of shooting an object in a heart shape may be applied to the virtual object based on whether the mouth of the user is open."

For example, in the example embodiment of FIG. 3, the electronic device 110 may manage a plurality of events associated with combinations by setting an event for each combination of values associated with the plurality of components prior to operation 310. In this case, the electronic device 110 may extract an event corresponding to the determined combination of values from among the plurality of events in operation 340 and may apply the extracted event to the virtual object in operation 350.

As described above, because events are determined based on the combination of values of components, it is possible to apply a change in the object, for example, a facial expression of the user or an angle of a face of the user, in an image. At the same time, because events may be manufactured to be suitable for the virtual object, natural events that suit the virtual object may be applied to the virtual object.

Figure 6:
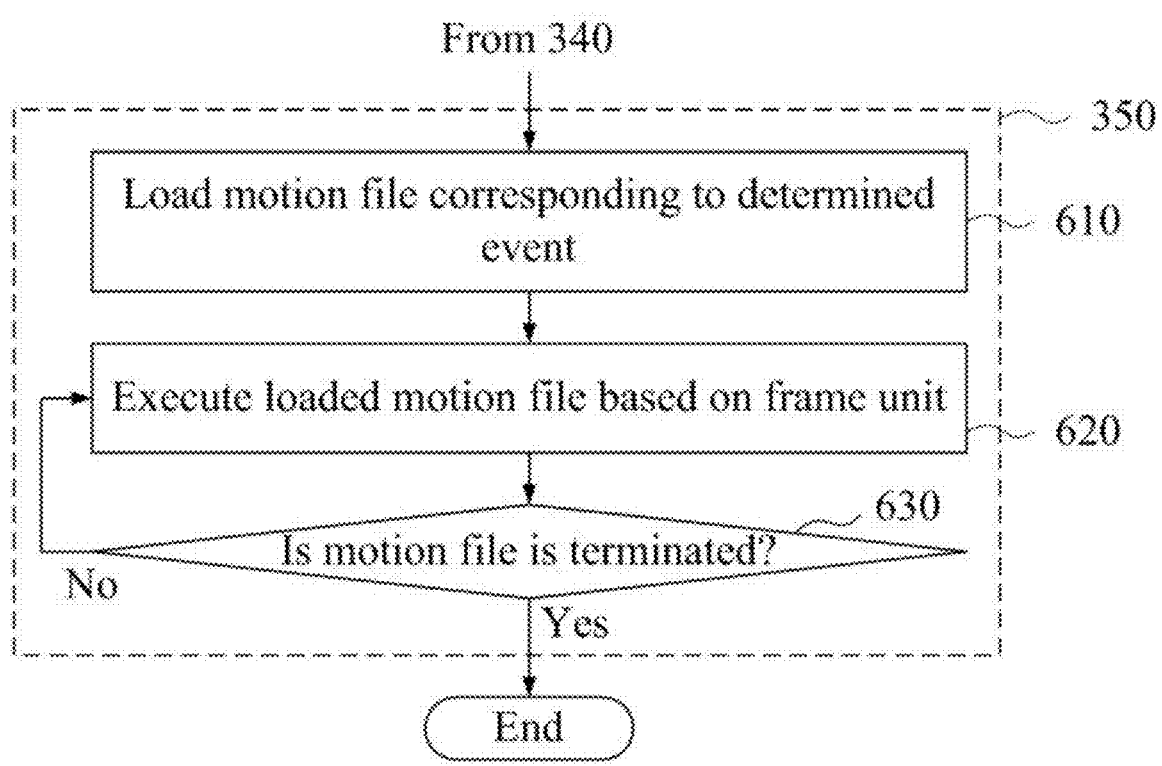
FIG. 6 is a flowchart illustrating an example of a method of applying an event to a virtual object according to at least one example embodiment.

FIG. 6 is a flowchart illustrating an example of a method of applying an event to a virtual object according to at least one example embodiment. Operations 610 through 630 of FIG. 6 may be included in operation 350 of FIG. 3 and performed.

Referring to FIG. 6, in operation 610, the electronic device 110 may load a motion file corresponding to the determined event. An event may be desired (or alternatively, preset) for a combination of component values and a motion file corresponding to the event may be created and managed. The motion file may include at least one motion frame to apply an animation for a virtual object. For example, a motion file corresponding to "heart shoot" may include motion frames to apply a heart shooting animation to the virtual object.

In operation 620, the electronic device 110 may execute the loaded motion file based on a frame unit. For example, the electronic device 110 may apply a first motion frame included in the motion file to a current frame for displaying the virtual object.

In operation 630, the electronic device 110 may verify whether the motion file is terminated. Here, if the motion file is terminated, an application of the event may be terminated. Otherwise, that is, unless the motion file is terminated, operation 620 may be performed again. For example, if the motion file includes three motion frames, the three motion frames may be sequentially applied to frames for displaying the virtual object. Once all of the motion frames are applied, it may indicate that the motion file is terminated.

That is, the electronic device 110 may sequentially apply motion frames of an animation included in the loaded motion file to frames for displaying the virtual object based on a frame unit, while repeating operations 620 and 630.

In the example embodiment of FIG. 3, the electronic device 110 may normalize a size and an angle of the object based on extracted landmark information after operation 310.

Figure 7:
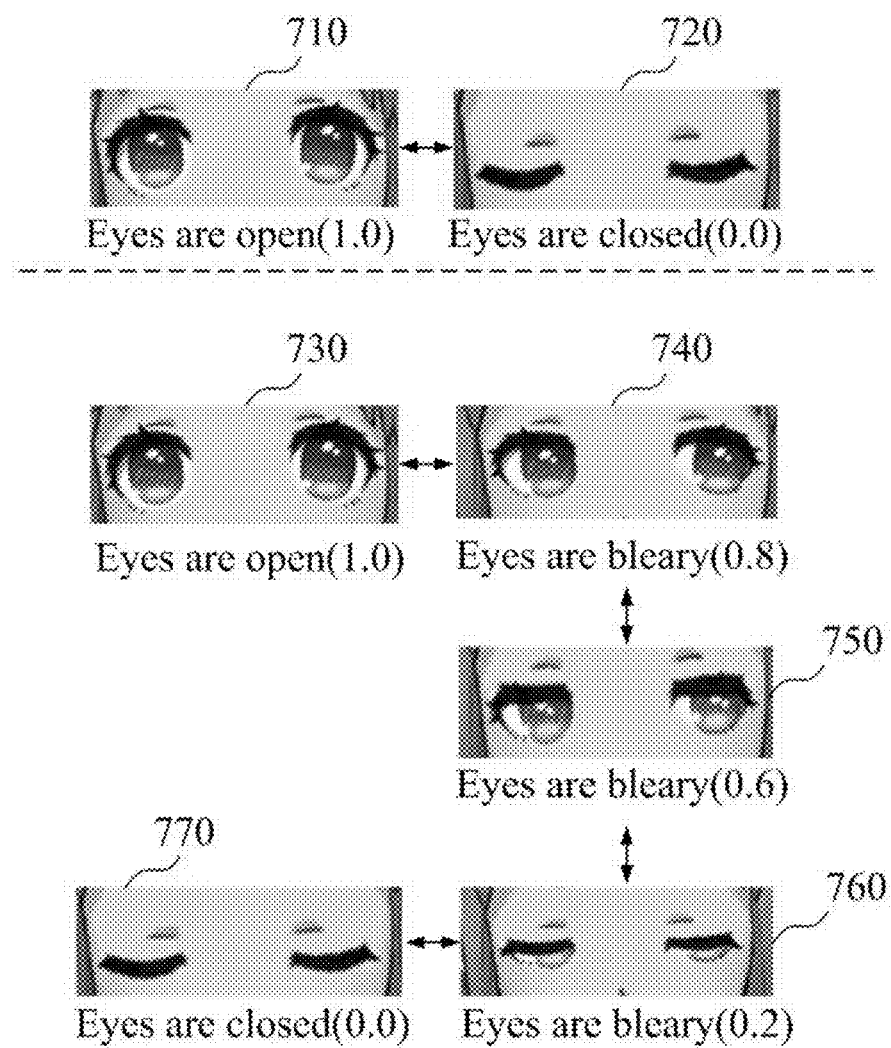
FIG. 7 illustrates an example of a plurality of motion frames included in a motion file according to at least one example embodiment.

FIG. 7 illustrates an example of a plurality of motion frames included in a motion file according to at least one example embodiment. In reality, a blinking speed of a person is really fast. Therefore, if only a state 710 in which both eyes are open and a state 720 in which both eyes are closed are mapped to an avatar, an unnatural motion may be output. Accordingly, the electronic device 110 may provide a further natural motion of a virtual object using a plurality of motion frames 730, 740, 750, 760, and 770.

A format of the motion file may be represented in a form of, for example, (landmark component ID=change in value classified by ","). For example, referring to FIG. 7, a motion file of closing both eyes may be represented as (EL=1.0, 0.8, 0.6, 0.2, 0.0, ER=1.0, 0.8, 0.6, 0.2, 0.0). This representation may indicate that the motion file includes five motion frames, such as a first motion frame in which each of left eye and right eye has a value of 1.0, a second motion frame in which each of left eye and right eye has a value of 0.8, a third motion frame in which each of left eye and right eye has a value of 0.6, a fourth motion frame in which each of left eye and right eye has a value of 0.2, and a fifth motion frame in which each of left eye and right eye has a value of 0.0.

Figure 8:
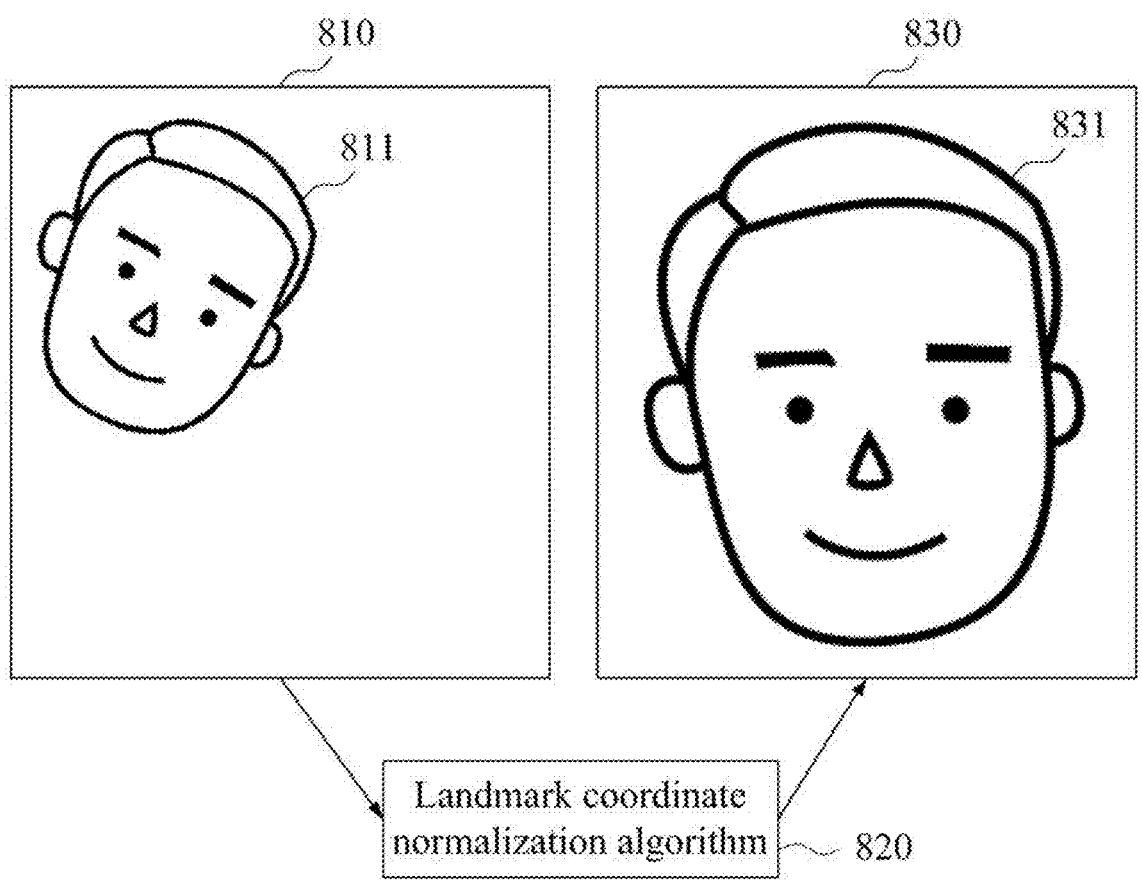
FIG. 8 illustrates an example of normalizing landmark coordinates according to at least one example embodiment.

FIG. 8 illustrates an example of normalizing landmark coordinates according to at least one example embodiment. Referring to FIG. 8, the electronic device 110 may normalize an object 811 included in an input image frame 810 to be an object 831 of an output frame 830 using a landmark coordinate normalization algorithm 820.

For example, if a photo is taken using a camera, a size, a location (a relative location), and/or an angle of a face may be different in each image. In this case, a size and a location of an eye may vary. Here, the electronic device 110 may perform adjustment so that the same person may have a similar size, location, and/or angle through a landmark normalization process. For example, the landmark coordinate normalization algorithm 820 may normalize a landmark by adjusting a relative location of a pupil recognized from a face. It is provided as an example only and various known normalization algorithms may be applied.

The landmark coordinate normalization may acquire a relative value based on normalized landmark coordinates although a size, a location, an angle, etc., of an object, for example, the face, are different in an input image. To this end, the electronic device 110 may normalize landmark coordinates of the object through a process of converting a size of a recognized face through a scale factor and a rotation using pitch, roll, and yaw. The normalized coordinate values may be two-dimensional (2D) coordinates.

Further, in the example embodiment of FIG. 3, after operation 310 or after the aforementioned landmark coordinate normalization, the electronic device 110 may correct coordinates of landmark components of the object recognized through landmark information extracted from a current frame of an image, based on landmark information extracted from a previous frame of the image. For example, in an image captured and input through a mobile phone camera of the user, landmark coordinates may be determined to be uneven due to a hand shake and the like. Accordingly, when performing a facial recognition, the electronic device 110 may normalize result coordinates by applying a weight function using a deviation of an angle, for example, pitch, roll, and yaw, of the face in the previous frame.

Figure 9:
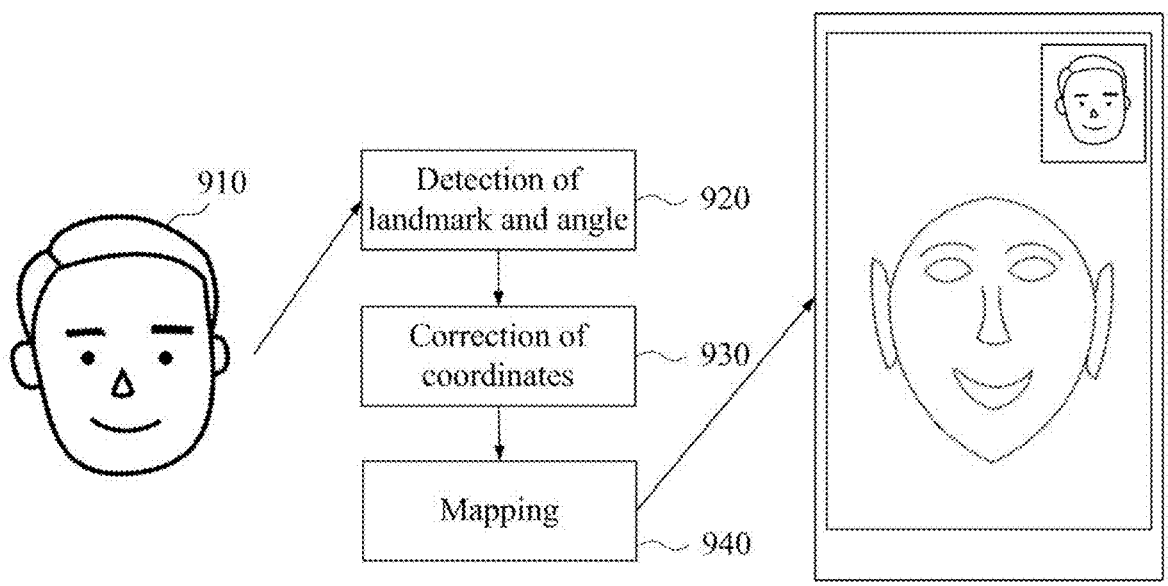
FIG. 9 illustrates an example of correcting landmark coordinates according to at least one example embodiment.

FIG. 9 illustrates an example of correcting landmark coordinates according to at least one example embodiment. Referring to FIG. 9, in operation 920, the electronic device 910 may detect a landmark and an angle of an object 910. Operation 920 of detecting the landmark and the angle may correspond to operation 310 of extracting landmark information or an operation of extracting landmark information in operation 310 and then normalizing landmark coordinates as described with FIG. 8.

In operation 930, the electronic device 110 may correct landmark coordinates. For example, when performing a facial recognition, the electronic device 110 may normalize result coordinates by applying a weight function using a deviation of an angle, for example, pitch, roll, and yaw, of a face in a previous frame. For example, the weight function may be defined as represented by the following Equation 1.

$$y_i = x_i \cdot \alpha + y_{i-1} \cdot (1-\alpha) \quad [\text{Equation 1}]$$

In Equation 1, $y_i$ denotes an output of an $i^{th}$ frame, $x_i$ denotes an input of the $i^{th}$ frame, and a denotes a credibility having a value between 0 and 1. Further, α may be calculated as a ratio for a difference of an angle (e.g., pitch, roll, and yaw) of the face in the previous frame according to the following Equation 2.

$$\alpha = 1 - \max\left(\frac{yaw_i - yaw_{i-1}}{yaw_{max}}, \frac{roll_i - roll_{i-1}}{roll_{max}}, \frac{pitch_i - pitch_{i-1}}{pitch_{max}}\right) \quad [\text{Equation 2}]$$

In Equation 2, $yaw_i$ denotes yaw of a facial angle in the $i^{th}$ frame, $roll_i$ denotes roll of the facial angle in the $i^{th}$ frame, and $pitch_i$ denotes pitch in the $i^{th}$ frame. Further, $yaw_{max}$, $roll_{max}$, and $pitch_{max}$ denote maximum variation values of pitch, roll, and yaw, respectively.

Thus, the coordinates of the landmark components of the object extracted from the current frame of the image may be corrected using a credibility value that is calculated based on a variation between an angle for each rotational axis of the object recognized from the current frame and an angle for each rotational axis of the object recognized from the previous frame.

Further, in operation 940, the electronic device 110 may map a facial expression of a user or an event to a virtual object, for example, a face of a character corresponding to a face of the user, based on landmark information in which coordinates are corrected. It is described with reference to FIG. 3.

Meanwhile, the electronic device 110 may use a separate method of identifying blinking of both eyes and a wink in the face of the user.

Figure 10:
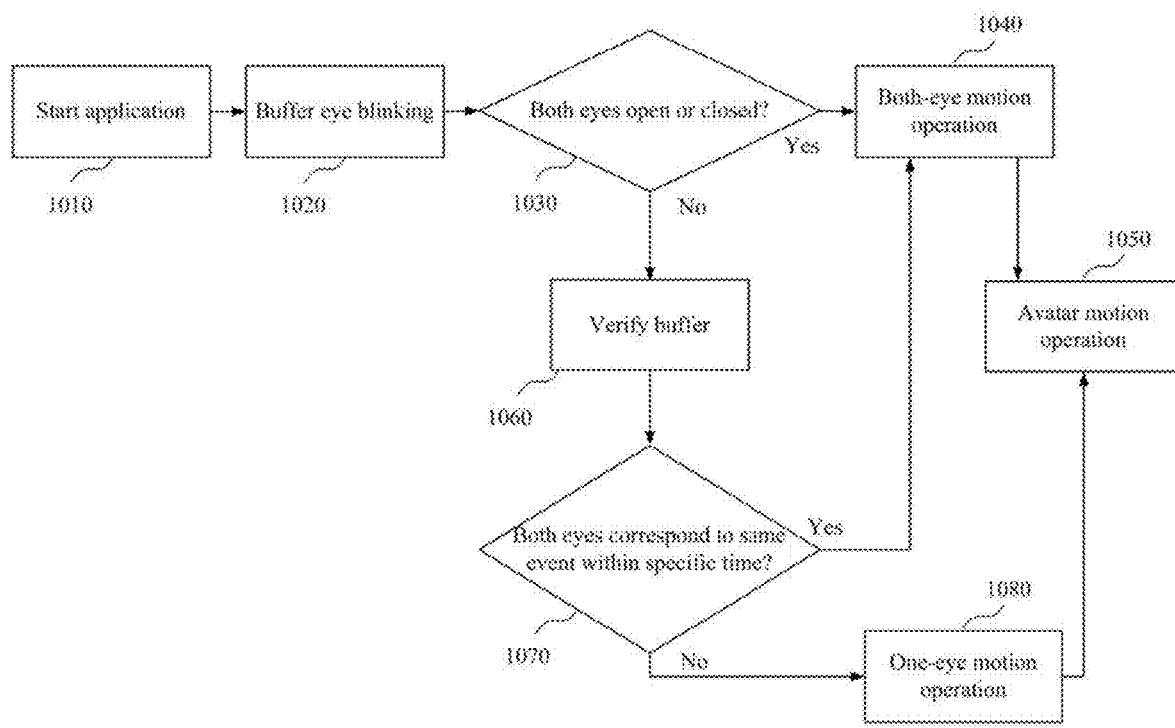
FIG. 10 is a flowchart illustrating an example of a method of distinguishing blinking of both eyes and a wink of a one eye according to at least one example embodiment.

FIG. 10 is a flowchart illustrating an example of a method of distinguishing blinking of both eyes and a wink of a one eye according to at least one example embodiment.

Referring to FIG. 10, once an application starts in operation 1010, the electronic device 110 may buffer information associated with eye blinking in operation 1020. For example, the electronic device 110 may measure a relative value indicating a level at which both eyes included in a face of a user are open with respect to each of a desired (or alternatively, preset) number of consecutive frames included in an image and may store the measured relative value in a buffer. Here, examples of the relative value are described above with reference to FIG. 7.

Here, in operation 1030, the electronic device 110 may verify whether both eyes are currently open or closed. If both eyes are open or if both eyes are closed, a both-eye motion operation 1040 may be verified and an avatar motion operation 1050 may be determined.

On the contrary, if both eyes are not open or if both eyes are not closed, the electronic device 110 may verify the buffer in operation 1060. For example, in operation 1070, the electronic device 110 may verify whether both eyes correspond to the same event (in which both eyes are open or in which both eyes are closed) within a specific time from the buffer. The specific time may correspond to, for example, a desired (or alternatively, preset) number of frames. For example, if the same event for the both eyes is present in the desired (or alternatively, preset) number of consecutive frames by analyzing relative values of the frames in the buffer (now shown), the electronic device 110 may verify the both eye motion operation 1040. If the same event is not present in the corresponding frames, the electronic device 110 may verify a one-eye motion operation 1080. In this case, the electronic device 110 may determine the avatar motion operation 1050 based on the one-eye motion operation 1080.

In other words, the method of distinguishing blinking of both eyes and a wink of a one eye according to the example embodiment may include operations such as measuring a relative value indicating a respective level at which each eye included in the face of the user is open or closed with respect to a number of consecutive frames of the image, and storing the measured relative value in a buffer, analyzing the relative value of the number of frames stored in the buffer, and applying an one-eye motion operation to the face of the character based on results of the analyzing indicating that each eye is open or closed.

Figure 11:
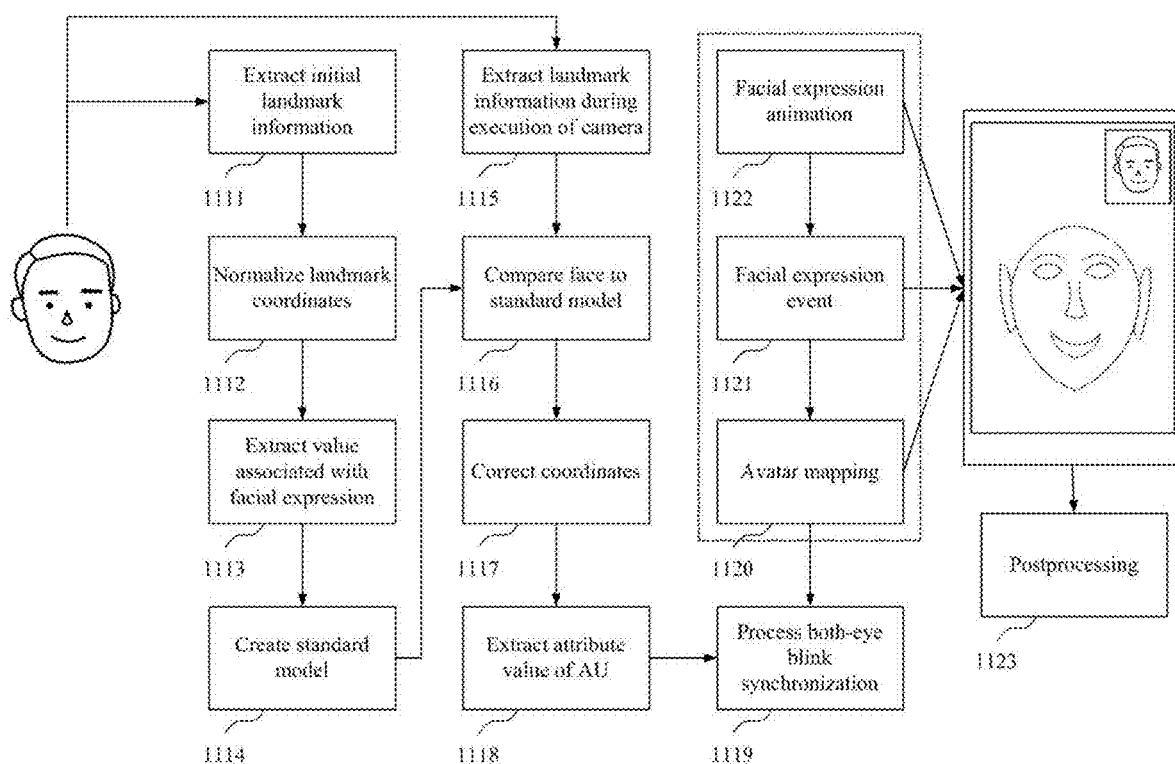
FIG. 11 is a flowchart illustrating an example of an overall service flow according to at least one example embodiment.

FIG. 11 is a flowchart illustrating an example of an overall service flow according to at least one example embodiment. FIG. 11 illustrates an example of an entire process of mapping a facial expression of a user to an avatar.

Referring to FIG. 11, in operation 1111, the electronic device 110 may extract initial landmark information by executing a camera. As described above, extracting information of landmarks, such as eyes, nose, a mouth, and/or eyebrows, in an image in which an object, such as a face of a user, is included may be easily conceived by one of ordinary skill in the art from the known techniques.

In operation 1112, the electronic device 110 may normalize landmark coordinates using a landmark coordinate normalization algorithm, which is described above with reference to FIG. 8.

In operation 1113, the electronic device 110 may extract a value associated with a facial expression. For example, the electronic device 110 may extract a height at which an eye is open, a height at which a mouth is open, a distance between an eyebrow and an eye, and an angle of an eyebrow.

In operation 1114, the electronic device 110 may create a standard model based on the extracted value.

In operation 1115, the electronic device 110 may execute a camera, and may extract landmark information during execution of the camera.

In operation 1116, the electronic device 110 may compare the face to the standard model based on the extracted landmark information. The standard model may indicate a state of the face extracted initially in response to starting a service. For example, operation 1111 through operation 1114 may be involved in information associated with initial coordinates of landmarks (e.g., eyes, nose, a mouth, and/or eyebrows) of the face of the user that desires to use the service. In operation 1116, the electronic device 110 may compare locations and angles of changed landmarks in response to a change in the facial expression through the comparison with the standard model and may verify a changed state of a component. Because each user has a different shape or size of a landmark in an eye, a nose, a mouth, and/or an eyebrow, it may be difficult to specify a state value as an absolute size of a component. For example, if a size of a left eye of a user A is 2 cm and that of a user B is 1 cm based on a situation in which the left eye is widely open, further accurate measurement may be performed by proportionally calculating a change in the left eye using a standard model of each user. For example, if the size of the left eye of the user A that is 2 cm when the left eye is widely open is changed to 1 cm, the electronic device 110 may determine that the user A has half-closed the left eye.

In operation 1117, the electronic device 110 may correct the landmark coordinates based on a previous frame, which is described above with reference to FIG. 9.

In operation 1118, the electronic device 110 may extract an attribute value of an action unit (AU). The attribute value of the AU may indicate a variation value calculated through comparison to the standard model. That is, the standard model may indicate a set of initial values and the attribute value of the AU may indicate a set of changed values. For example, by referring to the standard model in which a height of a left eye is 2 cm, if the left eye is half-closed, the height of the left eye may be 1 cm. Here, the attribute value of the AU for the left eye may be 0.5.

In operation 1119, the electronic device 110 may process a both-eye blink synchronization, which is described above with FIG. 10. That is, in operation 1119, the electronic device 110 may select one of the both-eye motion operation 1040 and the one-eye motion operation 1080 using eye blink buffering of operation 1020.

In operation 1120, the electronic device 110 may map the face of the user and a face of the avatar based on landmark information, which is described with operation 320 of FIG. 3.

In operation 1121, the electronic device 110 may determine an event, which is described with operations 330 and 340 of FIG. 3.

In operation 1122, the electronic device 110 may determine a facial expression animation using a motion file described with reference to FIGS. 6 and 7.

Results of operation 1120, operation 1121, and operation 1122 may be applied in parallel to the avatar.

In operation 1123, the electronic device 110 may perform postprocessing. The postprocessing may include, for example, recording a moving picture, editing the recorded moving picture, storing the edited moving picture, converting an edited image to a moving GIF file, and sharing the edited moving picture or GIF file (e.g., sharing through a messaging service or a social network service) with respect to a screen of the avatar to which the facial expression of the user, various types of effects, and the like, are applied.

According to some example embodiments, it is possible to apply a change (e.g., a change in a facial expression) of an object (e.g., a face of user) included in an input image to a virtual object and to further naturally apply such a change to a virtual object by determining values of components (e.g., an eye, nose, a mouth, an eyebrow, and/or an angle of a face) predefined for the object, by selecting a single event from among events set or preset for the virtual object based on a combination of the determined values, and by applying the selected event to the virtual object.

The systems and or apparatuses described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in different embodiments, even if not specifically shown or described. The same may also be varied in many ways. Such variations are not to be regarded as a departure from the disclosure, and all such modifications are intended to be included within the scope of the disclosure.

What is claimed is:

1. A non-transitory computer-readable recording medium storing instructions that, when executed by a processor, cause the processor to implement an image processing method in conjunction with a computer, the image processing method comprising:
   extracting landmark information of an object included in an input image;
   mapping the object included in the input image to a virtual object based on the landmark information, the virtual object being an avatar or a character;
   determining values of a plurality of components with respect to the object based on the landmark information;
   determining an event corresponding to a combination of the determined values of the plurality of components; and
   applying the determined event to the virtual object.

2. The non-transitory computer-readable recording medium of claim 1, wherein the plurality of components comprises a plurality of landmark components included in the object and a plurality of angular components representing a rotation of the object.

3. The non-transitory computer-readable recording medium of claim 2, wherein:
   the image processing method further comprises setting and managing a plurality of shape values representing two or more different shapes for one or more of the plurality of landmark components; and
   the determining a values of the plurality of components comprises determining a shape value corresponding to a shape of a first landmark component as a value of the first landmark component, the first landmark component being one from among the plurality of landmark components, the shape of the first landmark component determined based on the landmark information, the landmark information including a first set of shape values for the first landmark component.

4. The non-transitory computer-readable recording medium of claim 2, wherein:
   the plurality of angular components corresponds to a plurality of rotational axes associated with the object;
   the image processing method further comprises setting and managing a plurality of angular values representing two or more different angles for one or more of the plurality of rotational axes; and
   the determining a values of the plurality of components comprises,
      determining an angle of the object for a first rotational axis among the plurality of rotational axes based on the landmark information, and
      determining an angular value corresponding to the determined angle of the object from among the plurality of angular values managed for the first rotational axis as a value of an angular component corresponding to the first rotational axis.

5. The non-transitory computer-readable recording medium of claim 1, wherein:
   the image processing method further comprises managing a plurality of events associated with a plurality of combinations by setting an event for each combination of values associated with the plurality of components; and
   the determining an event comprises extracting an event corresponding to the combination of the determined values from among the plurality of events.

6. The non-transitory computer-readable recording medium of claim 1, wherein the applying the determined event comprises:
   loading a motion file corresponding to the determined event; and
   sequentially applying motion frames of an animation included in the loaded motion file to frames for displaying the virtual object based on a frame unit.

7. The non-transitory computer-readable recording medium of claim 1, wherein the image processing method further comprises:
   normalizing at least one of a size, a location, or an angle of the object based on the extracted landmark information.

8. The non-transitory computer-readable recording medium of claim 2, wherein the image processing method further comprises:
   correcting coordinates of the landmark components of the object recognized through the landmark information extracted from a current frame of the input image based on the landmark information extracted from a previous frame of the input image.

9. The non-transitory computer-readable recording medium of claim 8, wherein the correcting comprises correcting the coordinates of the landmark components of the object extracted from the current frame of the input image using a credibility value that is calculated based on a variation between an angle for each rotational axis of the object recognized from the current frame and an angle for each rotational axis of the object recognized from the previous frame.

10. The non-transitory computer-readable recording medium of claim 1, wherein:
the object comprises a face of a user included in the image input through a camera; and
the virtual object comprises a face of the character to be mapped to the face of the user in real time.

11. The non-transitory computer-readable recording medium of claim 10, wherein the image processing method further comprises:
measuring a relative value indicating a level at which each eye included in the face of the user is open or closed with respect to a number of consecutive frames of the image, and storing the measured relative value in a buffer;
analyzing the relative value of the number of frames stored in the buffer; and
applying an one-eye motion operation to the face of the character based on results of the analyzing indicating that each eye is open or closed.

12. An image processing method comprising:
extracting landmark information of an object included in an input image;
mapping the object included in the input image to a virtual object based on the landmark information, the virtual object being an avatar or a character;
determining values of a plurality of components with respect to the object based on the landmark information;
determining an event corresponding to a combination of the determined values of the plurality of components; and
applying the determined event to the virtual object.

13. The image processing method of claim 12, wherein the plurality of components comprises a plurality of landmark components included in the object and a plurality of angular components representing a rotation of the object.

14. The image processing method of claim 13, further comprises:
setting and managing a plurality of shape values representing two or more different shapes for one or more of the plurality of landmark components, and
the determining values of the plurality of components comprises determining a shape value corresponding to a shape of a first landmark component as a value of the first landmark component, the first landmark component being one from among the plurality of landmark components, the shape of the first landmark component determined based on the landmark information, the landmark information including a first set of shape values for the first landmark component.

15. The image processing method of claim 13, wherein:
the plurality of angular components corresponds to a plurality of rotational axes associated with the object;
the image processing method further comprises setting and managing a plurality of angular values representing two or more different angles for each of the plurality of rotational axes; and
the determining values of the plurality of components comprises,
determining an angle of the object for a first rotational axis among the plurality of rotational axes based on the landmark information, and
determining an angular value corresponding to the determined angle of the object from among the plurality of angular values managed for the first rotational axis as a value of an angular component corresponding to the first rotational axis.

16. The image processing method of claim 12, further comprising:
managing a plurality of events associated with a plurality of combinations by setting an event for each combination of values associated with the plurality of components,
wherein the determining an event comprises extracting an event corresponding to the combination of the determined values from among the plurality of events.

17. The image processing method of claim 12, wherein the applying the determined event comprises:
loading a motion file corresponding to the determined event; and
sequentially applying motion frames of an animation included in the loaded motion file to frames for displaying the virtual object based on a frame unit.

18. The image processing method of claim 13, further comprising:
correcting coordinates of the landmark components of the object recognized through the landmark information extracted from a current frame of the input image based on the landmark information extracted from a previous frame of the input image.

19. The image processing method of claim 18, wherein the correcting comprises correcting the coordinates of the landmark components of the object extracted from the current frame of the input image using a credibility value that is calculated based on a variation between an angle for each rotational axis of the object recognized from the current frame and an angle for each rotational axis of the object recognized from the previous frame.

* * * * *